INVENTORS
JACK A. HUNTER
JOHN B. MANGIERI
BY Scrivener & Parker
ATTORNEYS

INVENTORS
JACK A. HUNTER
JOHN B. MANGIERI

BY Scrivener & Parker

ATTORNEYS

United States Patent Office 3,190,806
Patented June 22, 1965

3,190,806
CONTINUOUSLY REFUELED NUCLEAR REACTORS
John B. Mangieri, Perry Hall, and Jack A. Hunter, Baltimore, Md., assignors to Martin-Marietta Corporation, Baltimore, Md., a corporation of Maryland
Filed Oct. 9, 1962, Ser. No. 229,411
11 Claims. (Cl. 176—32)

The present invention relates to the subject of neutronics and particularly to power producing neutron chain reacting systems, also referred to as neutronic or nuclear reactors or piles, the latter name having been originally adopted for the active portions of the systems employing uranium or other fissionable bodies geometrically arranged in graphite or other moderator in the form of lattice structures. The invention relates, more particularly, to means for continuously refueling such nuclear reactors.

In this specification and in the accompanying claims the phrase "continuously refueled" refers to a nuclear reactor core which is constructed to contain a number of separate fuel bundles which are received into the active lattice of the reactor through an inlet port and which are moved through the core of the reactor where they undergo reaction, and are finally removed from the reactor as spent fuel bundles. While the invention is not limited to a passage through the active lattice having any specific shape or geometry, a spiral passage, which may be either simple or compound, is preferred and the invention is described herein as having such configurations, for purposes of illustration and description of the invention and without imposing any limitation thereon. A type of fuel bundle which may be utilized in the present invention is described in a copending application by William F. Beutel entitled Flexible Fuel Bundle for Continuously Refueled Nuclear Reactors, Serial No. 158,691, filed December 12, 1961, now Patent No. 3,167,484 granted January 26, 1965.

Presently available nuclear power reactors must be shut down wherever it becomes necessary to refuel. This situation causes undesirable restrictions on the design of reactors and results in increased costs associated with the construction, installation and operation of such systems. It is therefore the primary object of this invention to provide a nuclear reactor which is continuously refueled, thereby eliminating the necessity of shutting down the reactor for refueling.

Another object of this invention is to make available a nuclear reactor more readily adaptable for portable power systems than known reactors by providing a reactor having an increased operating lifetime and being of lighter weight and smaller size for the same power output.

A further object of this invention is to reduce the initial investment, installation costs and operating expenses associated with nuclear power systems by providing a nuclear reactor which does not require a standby power supply, is of reduced size for the same power output, reduces the initial fuel requirement as well as the operating fuel requirement, eliminates the costs normally associated with the refueling of conventional reactors, and achieves a uniformly high burnup of fuel.

Other objects and advantages of this invention will become apparent as the following description is read in connection with the accompanying drawings in which.

In accordance with the present invention, a reactor is provided in which fresh fuel elements are installed as burned up fuel elements are removed, this being accomplished by the provision of means for introducing fresh fuel elements into the pressure vessel without relieving the pressure therein, other means for guiding the fuel elements along a predetermined path within the pressure chamber leading from the inlet port to the reacting area adjacent to the center of the core and for moving the bundles along this path, and additional means for removing spent fuel elements from the pressure vessel without relieving the pressure therein. In order to accomplish this step-by-step progression of fuel elements into, through and from the pressure vessel the core is subdivided into a number of smaller individual assemblies of fuel tubes which are referred to herein as bundles and which are separately handled. These bundles may have any geometrical shape in cross section which may be found desirable or necessary for their proper movement through the pressure vessel in a predetermined pattern.

Figure 1:
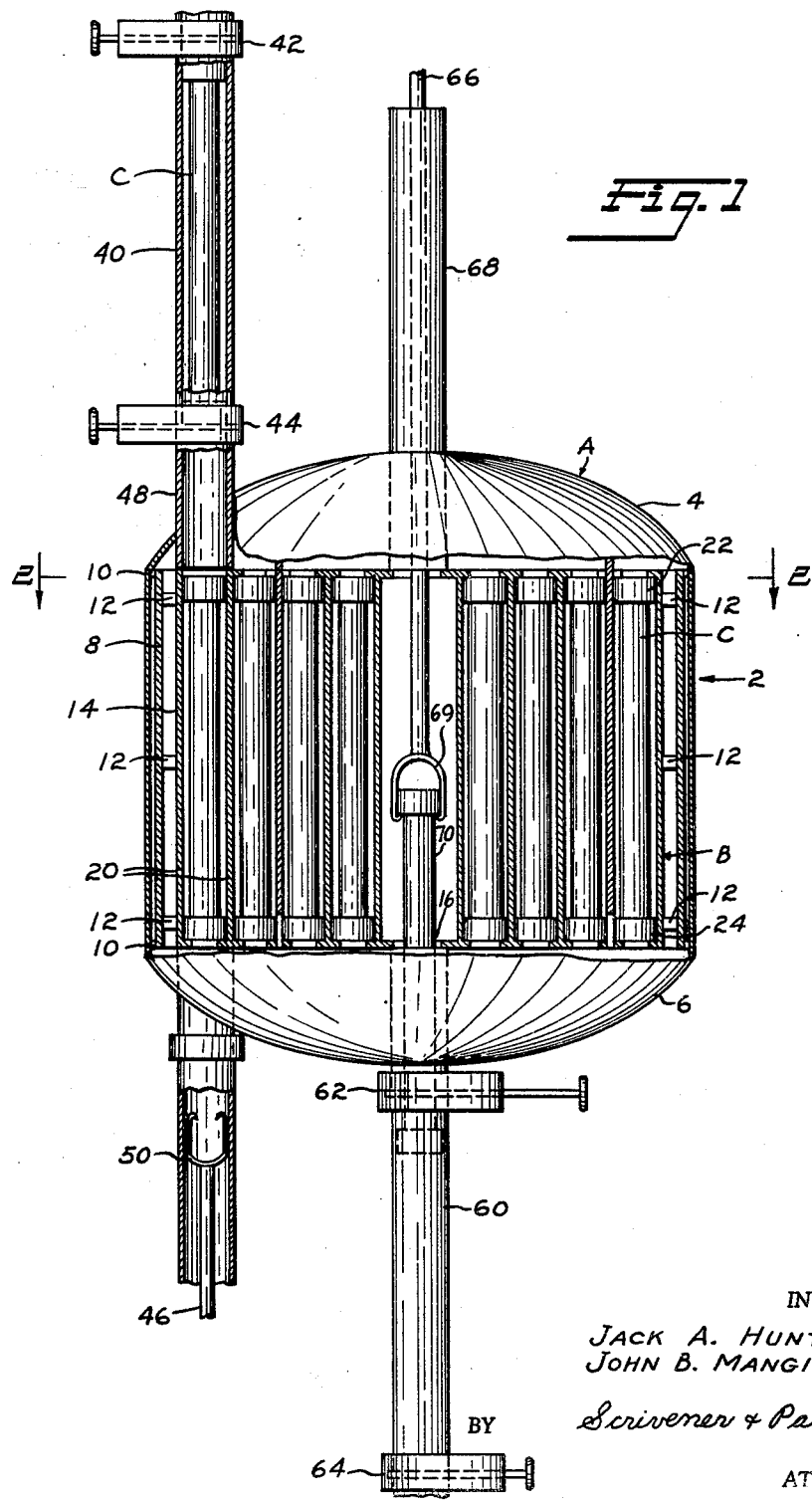
FIG. 1 is a side view of a reactor vessel according to the invention being broken away at the active lattice section to show the core provided by the invention.

A reactor vessel with inlet and discharge means for fuel bundles is disclosed in FIG. 1 of the drawings, and comprises a high pressure reactor vessel A which, as in usual practice, is cylindrical in shape throughout its active lattice portion 2, and has ellipsoid heads 4, 6 at its top and bottom, respectively. Within the cylindrical lattice part 2 of the reactor vessel there is a concentric thermal shield 8 which is open at both top and bottom and is supported by lugs 10 on the reactor vessel wall. Within the thermal shield is located the core B which is supported on the shield by lugs 12. The design and fabrication of the pressure vessel and thermal shield conform to standard specifications, procedures and stress limits which are specified and well known to those skilled in the art. The entire reactor vessel is placed within an appropriate shield (not shown) in accordance with standard practice and all parts are designed accordingly.

In accordance with the invention the core B comprises a continuous path or track leading from an inlet port 14 for the introduction of fuel bundles C to the center of the core at which an exit port 16 is provided. In the preferred form of the invention this track is spiral in shape and is defined by a spiral vertical wall 20, the spaced convolutions of which define the inlet port 14 at the outer end of the wall and the exit port 16 at its inner end. The convolutions of the wall are spaced apart just sufficiently to receive between them the upper and lower bearings 22, 24 of the fuel bundles and the vertical height of the wall is sufficient to receive the fuel bundles in vertical positions within the track formed by the wall.

Means are provided by the invention for admitting one fuel bundle at a time into the pressure vessel and positioning it adjacent to the inlet port of the core, all without relieving the pressure within the vessel. Such means comprise, first a vertical, cylindrical pressure lock chamber 40 which is positioned above the pressure vessel and at its periphery and which is sealed at its upper and lower ends by gate valves 42, 44, the distance between which is sufficient to accommodate the length of a fuel bundle C, as shown in FIG. 1. The lower end of the pressure lock 40 communicates with the interior of the pressure vessel 2. Any suitable means may be provided for moving a fuel bundle from the pressure lock chamber 40 (into which it is loaded by an operator using proper fuel bundle handling tools) into the pressure vessel 2, but in the preferred form of the invention this is performed by a vertically movable conventional control rod actuating rod 46 which breaches the bottom head 6 of the pressure vessel 2 through a pressure lock (not shown), extends through a guide channel 48 which traverses the pressure vessel 2, breaches the top head 4, and is sufficiently long to extend into the pressure lock chamber 40. This rod has a pronged device 50 on its upper end which engages the bottom bearing spindle on the fuel bundle to lower the bundle from the pressure lock chamber 40 into the pressure vessel 2. Suitable means, which are well known for actuating control rods, may be provided for operating the rod 46 and need be modified only to afford suitable rod travel.

Means are also provided by the invention for removing spent fuel bundles 70 through the exit port 16 at the center of the core without relieving pressure in the reactor vessel, and these means are preferably similar to those provided for fuel bundle admission. Briefly, the comprise a vertical, cylindrical pressure lock chamber 60 which is positioned below the center of the reactor vessel 2, having gate valves 62, 64, which are spaced vertically a sufficient distance to permit a fuel bundle to be received between them, and a vertically movable conventional control rod operating rod 66 which breaches the top head 4 of the reactor vessel through a pressure lock (not shown), extends through a guide channel 68 which traverses the pressure vessel, and is sufficiently long to extend into the pressure lock chamber 60. This rod has a pronged device 69 on its lower end to engage the upper bearing spindle on the spent fuel bundle 70. Again, suitable means are provided for operating the rod 66 to cause it to grasp the upper bearing spindle of a spent fuel bundle and lower it from the core into the pressure lock chamber 60, from which it may subsequently be removed into a conventional spent fuel cask. In FIG. 1 there is shown a spent fuel bundle 70 being lowered from the pressure vessel through the exit port 16 and into the pressure lock chamber 60. It should also be noted that as an alternative to the employment of devices such as conventional control rod actuators to introduce fuel bundles into the core from the pressure lock 40 and to remove fuel bundles from the core into the pressure lock 60, other means may be employed such, for example, as gravity.

Figure 2:
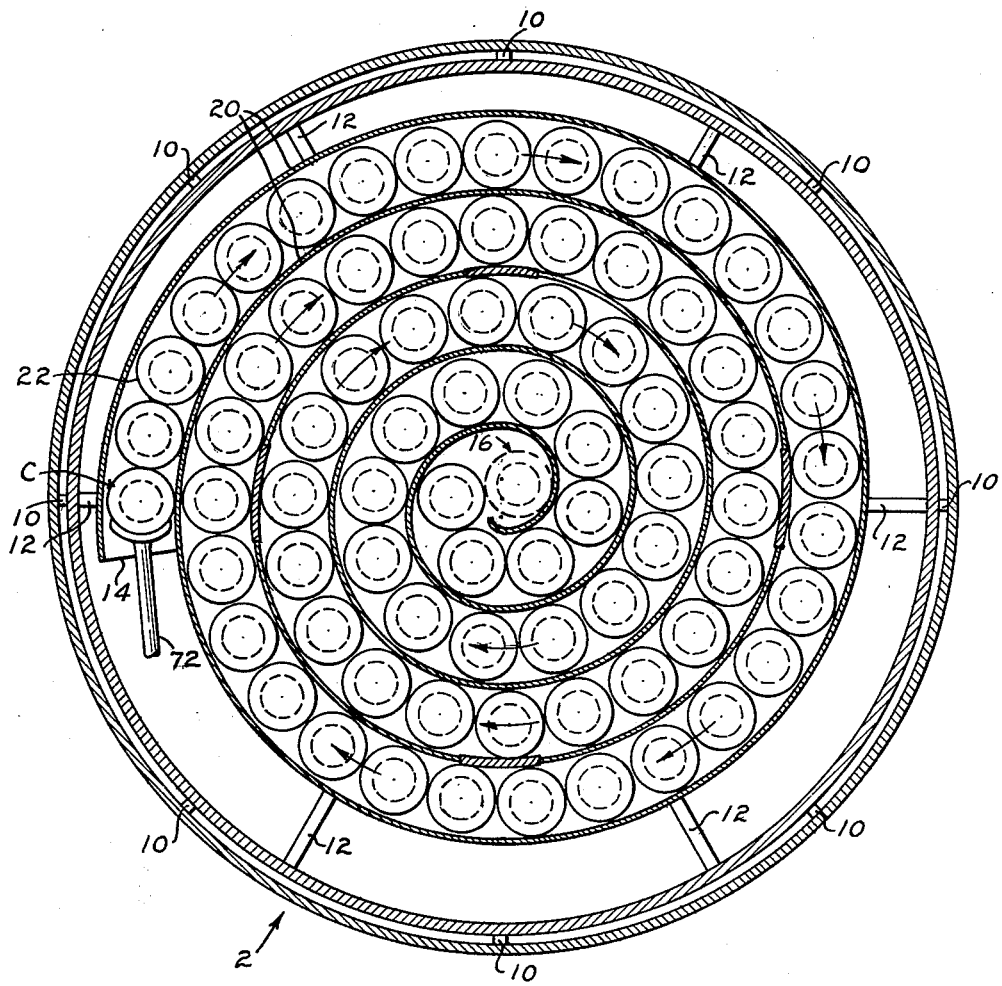
FIG. 2 is a sectional view taken on line 2—2 of FIG. 1 through the active lattice of the reactor.

The invention provides means for translating the fuel bundles along the track leading from the inlet port to the exit port at the center of the core, and this may be accomplished in any one of a number of ways within the scope of the invention. Possibly the simplest translating means relies merely on a pushing force exerted on the fuel bundles, and one of a pair of pushing rods 72 is disclosed in FIG. 2 of the drawings for engaging the upper and lower bearing spindles of a fuel bundle C which is positioned outside and adjacent the inlet port 14 to the spiral track, and which rods are operated to push the bundle into the track. Obviously, as successive bundles are fed into the track it will become full and, as each new bundle is inserted into the track a spent bundle will be displaced into the exit position, while those within the core will be advanced in a step-by-step manner along the track toward the exit port. Each of the rods 72 breaches the pressure vessel through a pressure lock (not shown) and suitable means are provided for reciprocating the rods to cause them to push a fuel bundle into the inlet port.

Figure 3:
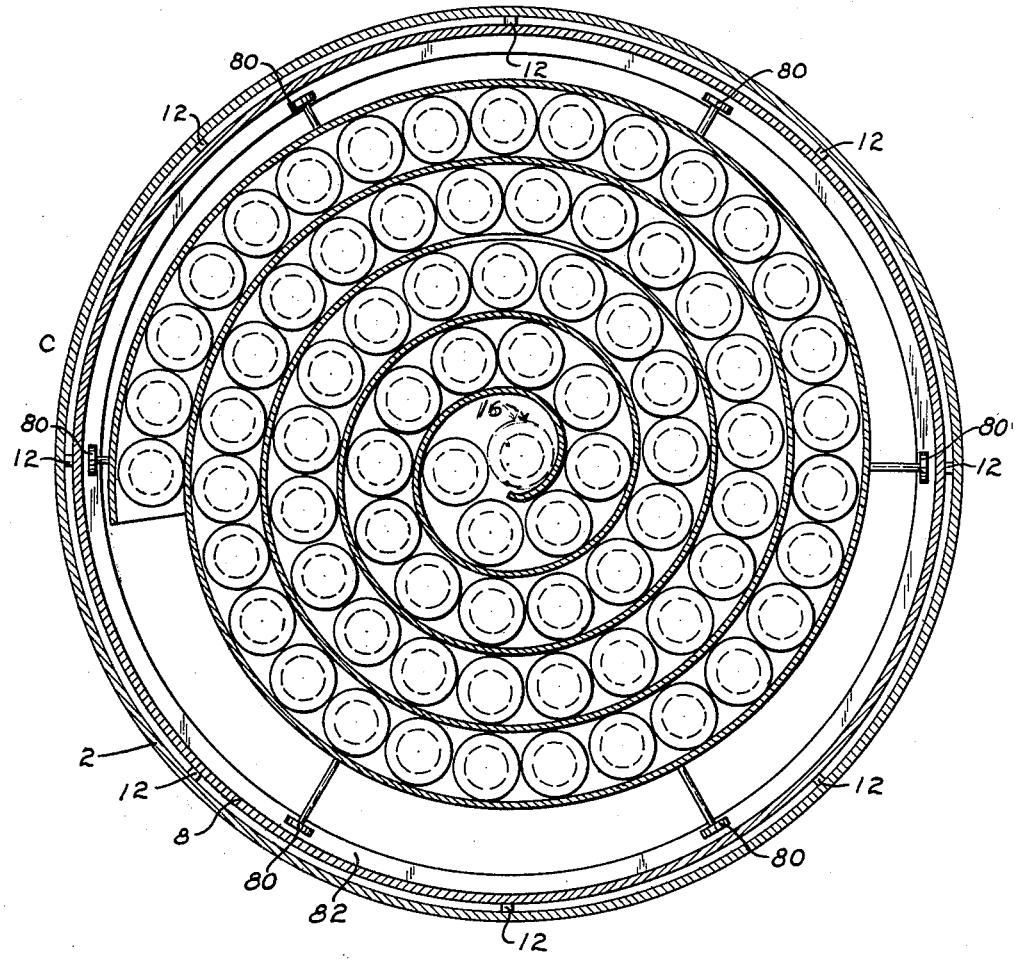
FIG. 3 is a sectional view which is similar to FIG. 2 but shows as alternative structure for translating fuel bundles through the core.

An alternative pushing type bundle translating means may be provided by rotating the core to cause its inlet port to move toward a bundle positioned adjacent the inlet port, causing the upper and lower bearings of the fuel bundle to slide into the upper and lower parts of the track. In this form of the invention, which is shown in FIG. 3, the core is supported on roller bearings 80 which move on a circular track 82 which is mounted on the inner surface of the thermal shield 8, as shown in FIG. 3, and suitable means are provided for imparting rotary oscillatory motion to the core to cause successive fuel bundles to be admitted to the core as they are positioned adjacent the inlet port and the inlet port is rotated toward and over them, each bundle admitted causing those within the core to advance one step toward the center of the core.

Any other mechanical or other means which is suitable may be provided, within the scope of the invention, for translating fuel bundles along the track through the core and, in view of the disclosures made herein, which provide a satisfactory translating means, no other specific disclosure of bundle translating means is necessary.

Figure 4:
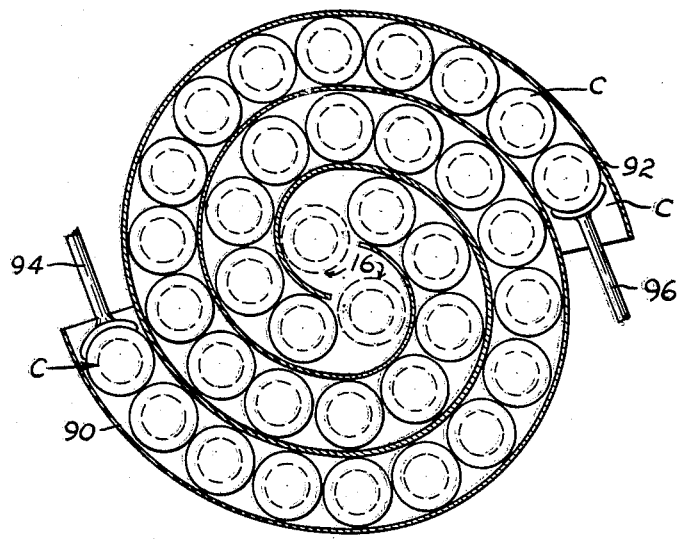
FIG. 4 shows a second form which the active lattice of the reactor may take.

The spiral path or track provided by the invention for guiding the fuel bundles through the core may have various geometries within the scope of the invention. For examples, as disclosed in FIGS. 2 and 3 of the drawings, the track may be a uniformly spaced, single spiral having four convolutions, although any other number of convolutions may be provided. Alternatively, as disclosed in FIG. 4, the track may comprise two spirals 90, 92 which are nested one within the other, forming a core which may have the same over-all dimensions as the single spiral track of FIGS. 2 and 3. Each track of this double spiral track has one-half the number of turns of the single spiral track of a core of the same size, and the required translating force is therefore halved. However, the double spiral track requires two leading mechanisms, at 94 and 96, and two bundle removing mechanisms (not shown) and this factor must be balanced against translating force and other requirements in determining the specific geometry of track to be used.

The operation of the reactor vessel refueling means provided by this invention will be apparent from the foregoing description. In such operation, each fuel bundle is introduced into the inlet pressure lock chamber 40 and from there is moved into the reactor vessel by the operating rod 46 to a position adjacent the inlet port of the core. The bundle is then moved into the spiral track of the core by any suitable means such as those described herein. The removal of a spent fuel bundle through the exit port of the core into the outlet pressure lock chamber 60 will leave a void at the center of the core and, if the core track is filled with fuel bundles, the movement of a bundle into the core track through the inlet port will move a spent fuel bundle into the center area of the core at or adjacent the exit port. Thus, the invention provides means for introducing a fuel bundle into the reactor vessel without relieving the pressure therein, means for moving such a fuel bundle into the core and for translating the fuel bundle through the core from the inlet port to the center area and exit port, and means for removing the fuel bundle from the reactor vessel without relieving the pressure therein.

While certain forms and embodiments which the invention may take are described and illustrated in this specification, it will be understood that these are only illustrative of the invention and that other embodiment and forms thereof, as well as modifications of those disclosed, may be made and practiced without departing in any way from the spirit or scope of the invention, for the limits of which reference must be made to the appended claims.

What is claimed is:

1. Refueling means for successively supplying fuel elements to a nuclear reactor having a pressure vessel, comprising a core adapted to fit within a nuclear reactor pressure vessel, the core having a port for the admission of fuel elements into the core, an exit port for the removal of fuel elements from the core, and a continuous track within the core extending from the inlet port to the exit port and constructed to receive a plurality of fuel elements perpendicularly with respect to the plane of the track and in lengthwise abutting relationship whereby the admission of a fuel element into the core through the inlet port moves all fuel elements therein along the track toward the exit port.

2. Refueling means for successively supplying fuel elements to a nuclear reactor having a pressure vessel, comprising a core adapted to fit within a nuclear reactor pressure vessel, the core having a port for the admission of fuel elements into the core, an exit port for the removal of fuel elements from the core, and a continuous spiral track within the core extending from the inlet port to the exit port and constructed to receive a plurality of fuel elements in abutting relation whereby the admission of a fuel element into the core through the inlet port moves all fuel elements therein along the track toward the exit port.

3. Refueling means for successively supplying fuel elements to a nuclear reactor having a pressure vessel, comprising a core adapted to fit within a nuclear reactor pressure vessel, the core having two ports for the admission of fuel elements into the core, at least one exit port for the removal of fuel elements from the core, and a plurality of continuous contoured tracks nested within each other within the core, each extending from one of the inlet ports to an exit port and each constructed to receive a plurality of fuel elements in abutting relation whereby the admission of a fuel element into the core through either inlet port will move all fuel elements along the associated track toward the exit port.

4. Refueling means for successively supplying fuel elements to a nuclear reactor having a pressure vessel, comprising a core adapted to fit within a nuclear reactor pressure vessel, the core having two ports for the admission of fuel elements into the core, at least one exit port for the removal of fuel elements from the core, and a continuous track consisting of two spirals nested within each other within the core each extending from one of the inlet ports to the exit port and constructed to receive a plurality of fuel elements in abutting relation whereby the admission of a fuel element into the core through either inlet port will move all fuel elements along the associated track toward the exit port.

5. Refueling means for successively supplying fuel elements to a nuclear reactor having a pressure vessel, comprising a core adapted to fit within a nuclear reactor pressure vessel, the core having a port for the admission of fuel elements into the core, an exit port for the removal of fuel elements from the core and pressure vessel and a continuous track within the core extending from the inlet port to the exit port and constructed to receive a plurality of fuel elements perpendicularly with respect to the plane of the track and in lengthwise abutting relationship whereby the admission of a fuel element into the core through the inlet port will move all fuel elements therein along the track toward the exit port, means for inserting a fuel element into the pressure vessel to a position adjacent the inlet port to the core, means for removing a fuel element from the core and pressure vessel through the exit port, and means for moving a fuel element adjacent the inlet port into the core through the inlet port.

6. Refueling means according to claim 5, in which the core is fixed from rotation with respect to the pressure vessel, and the means for moving the fuel element adjacent the inlet port into the core comprises at least one push rod positioned to engage the fuel element adjacent the inlet port.

7. Refueling means according to claim 5, in which the core is mounted for rotary oscillatory movement with respect to the pressure vessel whereby the rotary oscillatory movement of the core moves the inlet port to the track directly over and then away from the position of the fuel element adjacent the inlet port thereby moving the adjacent fuel element into the track.

8. Refueling means for successively supplying fuel elements to a nuclear reactor having a pressure vessel, comprising a core adapted to fit within a nuclear reactor pressure vessel, the core having a port for the admission of fuel elements into the core, an exit port for the removal of fuel elements from the core, a continuous track within the core extending from the inlet port to the exit port and constructed to receive a plurality of fuel elements perpendicularly with respect to the plane of the track and in lengthwise abutting relationship whereby the admission of a fuel element into the core through the inlet port will move all fuel elements therein along the track toward the exit port, means for inserting a fuel element into the pressure vessel at a position adjacent the inlet port of the core, means for preventing escape of pressure from the vessel during insertion of a fuel element, means for moving a fuel element into the inlet port and along the track, means for removing a fuel element from the track through the exit port of the core and from the pressure vessel, and means for preventing escape of pressure from the vessel during removal of a fuel element therefrom.

9. Refueling means according to claim 8, in which each means for preventing escape of pressure from the vessel comprises a pressure lock chamber communicating with the interior of the pressure vessel.

10. Refueling means for successively supplying fuel elements to a nuclear reactor having a pressure vessel, comprising a core adapted to fit within a nuclear reactor pressure vessel having a port for the admission of fuel elements into the core, an exit port for the removal of fuel elements from the core, a continuous track within the core extending from the inlet port to the exit port and constructed to receive a plurality of fuel elements perpendicularly with respect to the plane of the track and in lengthwise abutting relationship whereby the admission of a fuel element into the core through the inlet port will move all fuel elements therein along the track toward the exit port, and means for translating fuel elements into the core through the inlet port.

11. In a nuclear reactor having a reactor core, the improvement comprising: fuel admission means connected with said core, fuel removal means connected with said core, continuous guide means in said core extending between said admission means and said removal means and constructed to receive a plurality of fuel elements perpendicularly with respect to the plane of the guide means and in lengthwise abutting relationship and movably supported in said guide means, and fuel element translating means for simultaneously admitting at least one of said fuel elements to said guide means from said admission means and ejecting at least one of said fuel elements from said guide means into said fuel removal means.

References Cited by the Examiner

UNITED STATES PATENTS 2,725,993 12/55 Smith.
2,780,596 2/57 Anderson _____ 176—58
2,855,114 10/58 Ohlinger _____ 176—32 X

FOREIGN PATENTS 877,423 9/61 Great Britain.

CARL D. QUARFORTH, *Primary Examiner.*
REUBIN EPSTEIN, *Examiner.*